(12) United States Patent
Katz

(10) Patent No.: US 6,257,633 B1
(45) Date of Patent: Jul. 10, 2001

(54) ERGONOMIC LIFT AND TRANSPORT HARNESS

(76) Inventor: David L. Katz, 465 Tom Swamp Rd., Mt. Carmel, CT (US) 06518

( * ) Notice: Subject to any disclaimer, the term of this patent is extended or adjusted under 35 U.S.C. 154(b) by 0 days.

(21) Appl. No.: 09/388,311

(22) Filed: Sep. 1, 1999

(51) Int. Cl.⁷ ........................................ B65G 7/12
(52) U.S. Cl. ........................... 294/15; 224/266; 224/268
(58) Field of Search ................. 294/1.1, 15, 16; 224/157, 184, 201, 247, 259, 265, 266, 268, 627, 628, 633, 634

(56) References Cited

U.S. PATENT DOCUMENTS

| | | | |
|---|---|---|---|
| 605,993 | * | 6/1898 | Borgstrom .............................. 294/15 |
| 795,060 | * | 7/1905 | Payne ..................................... 294/15 |
| 2,651,441 | | 9/1953 | Rau et al. . |
| 2,739,007 | * | 3/1956 | Rauterberg ............................. 294/15 |
| 2,855,133 | | 10/1958 | Mullin . |
| 3,090,621 | | 5/1963 | Heimers et al. . |
| 3,377,095 | * | 4/1968 | Allen ..................................... 294/15 |
| 3,436,778 | * | 4/1969 | Stevens et al. .................... 294/15 X |
| 4,139,132 | * | 2/1979 | Fairchild .............................. 224/265 |
| 4,280,645 | | 7/1981 | Goodden . |
| 4,438,763 | | 3/1984 | Zablen . |
| 4,804,123 | * | 2/1989 | French ............................... 294/15 X |
| 4,874,120 | * | 10/1989 | Paton et al. .......................... 224/266 |

* cited by examiner

*Primary Examiner*—Johnny D. Cherry
(74) *Attorney, Agent, or Firm*—Bachman & LaPointe, P.C.

(57) ABSTRACT

The present invention relates to an ergonomically correct harness for transporting loads. The harness comprises a pair of arcuately shaped pieces which fit over the shoulders of a user. Attached to the rear of the arcuately shaped pieces are two rearwardly extending arms. The rearwardly extending arms are connected at a distal end to a load support arm. Mechanisms for allowing a load to be carried by the harness are attached to the load support arm. Attached to the front of the arcuately shaped shoulder pieces are members for adjusting the position of the harness on the user's shoulders. By adjusting the position of the harness via these members, one can lift a load attached to the harness. The harness of the present invention allows a user to lift a load and transport it using his/her chest muscles, arm muscles, and shoulder muscles. It is not necessary for a user to use his/her knees to lift the load. Further, the back of the user can be kept straight as the user transports the load.

18 Claims, 3 Drawing Sheets

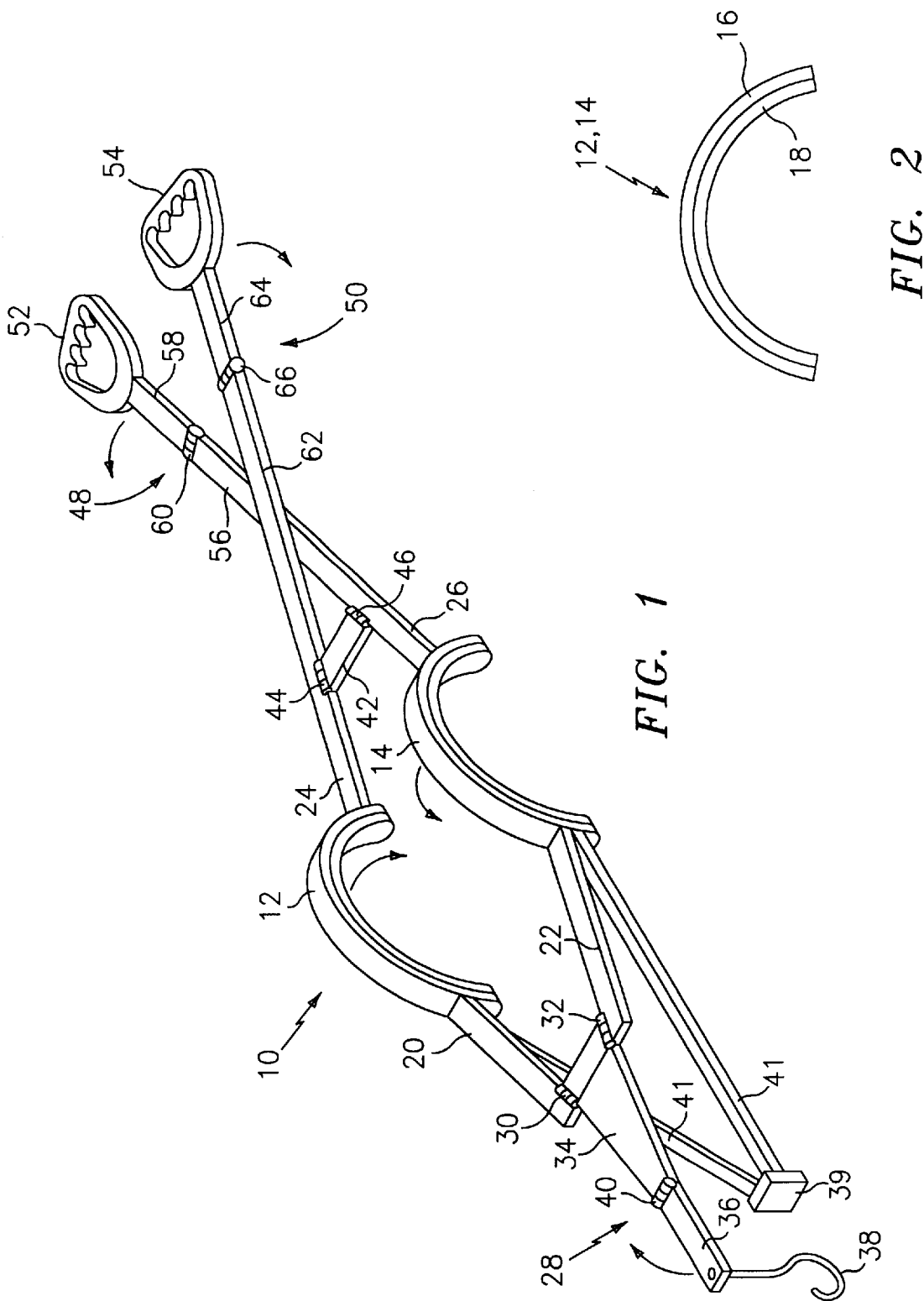

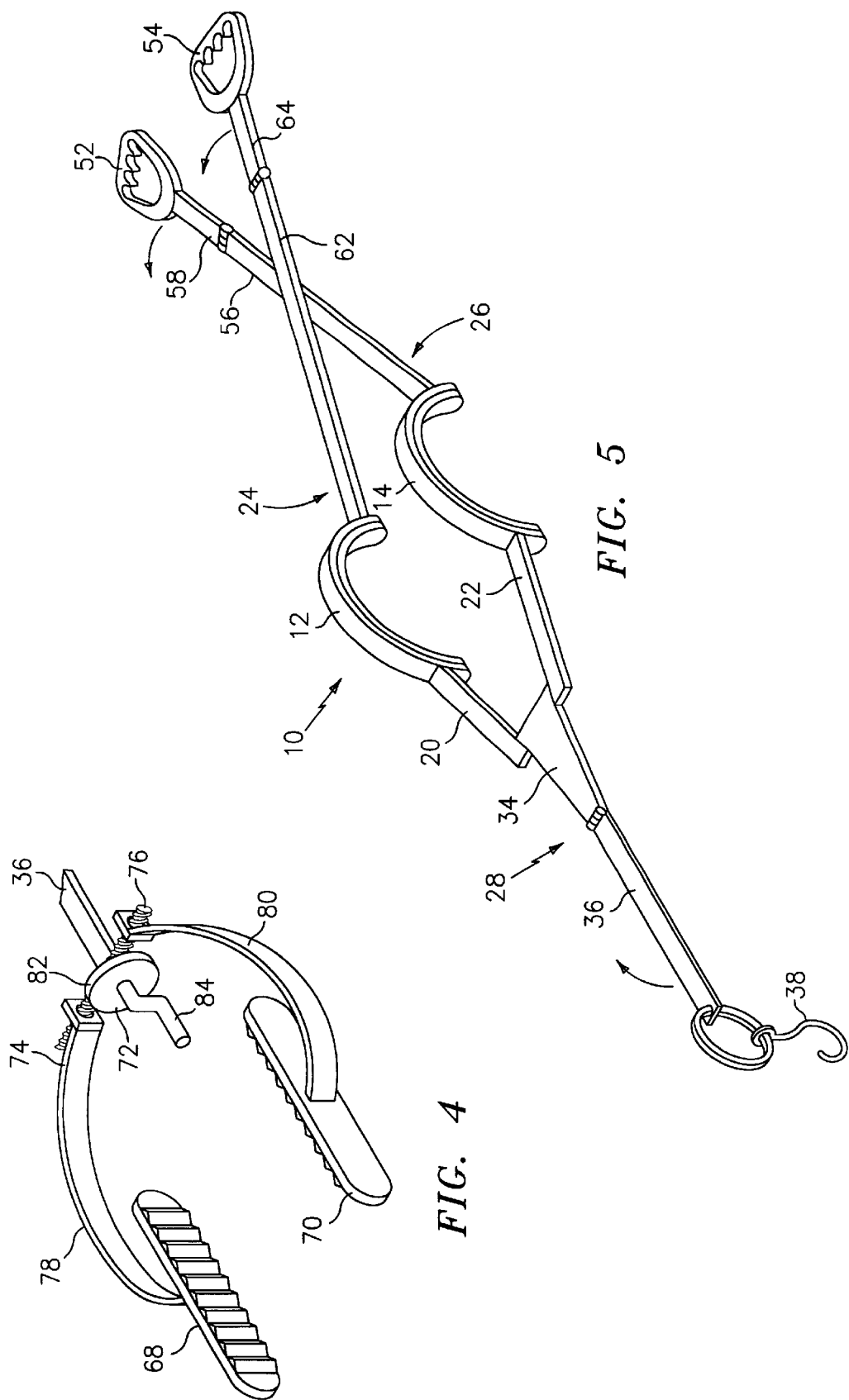

ERGONOMIC LIFT AND TRANSPORT HARNESS

BACKGROUND OF THE INVENTION

The present invention relates to an ergonomically correct harness to be worn by a user which facilitates the lifting and carrying of heavy objects.

There are many known body supported carriers and harnesses for facilitating the lifting and/or transport of a wide variety of articles. U.S. Pat. No. 2,651,441 to Rau et al., U.S. Pat. No. 2,855,133 to Mullin, U.S. Pat. No. 3,090,621 to Heimers et al., U.S. Pat. No. 4,280,645 to Goodden, and U.S. Pat. No. 4,438,763 to Zablen illustrate some of these carriers and harnesses.

Many of these devices however are not ergonomically correct. As a result, users suffer from injuries to their backs, knees and other body parts.

SUMMARY OF THE INVENTION

Accordingly, it is an object of the present invention to provide a harness for facilitating the lifting and carrying of weighted loads.

It is a further object of the present invention to provide a harness as above which is ergonomically sound and thereby prevents injury to a user.

It is a further object of the present invention to provide a harness as above which allows a user to use muscles in his/her arms, chest and shoulders to carry weighted loads.

The foregoing objects are attained by the harness of the present invention.

In accordance with the present invention, a harness to be worn by a user to enable the user to transport a load broadly comprises arcuately shaped pieces which fit over the shoulders of the user, first and second arms extending from the rear of the arcuately shaped pieces, means secured to the first and second arms to which the load to be transported may be attached, and means connected to the front of the arcuately shaped pieces for enabling the user to properly adjust and position the harness so that the load may be transported in an ergonomically correct manner. The arcuately shaped shoulder pieces, in a preferred construction, are padded to avoid the harness cutting into the user's shoulders. In a first embodiment of the harness of the present invention, the means to which the load to be transported may be attached comprises a hook to which a load carrier may be attached. In a second embodiment of the harness of the present invention, the means to which the load to be transported may be attached comprises means for gripping the load.

The harness of the present invention is designed to allow a user to lift and carry a load using arm, chest and shoulder muscles while keeping one's back straight. It also allows a user to carry uneven loads, such as logs, over uneven ground. One of the significant advantages to the harness of the present invention is that it does not require use of the knees in the lifting operation. Another advantage to the harness of the present invention is that it is collapsible to facilitate its transport and/or storage.

Other details of the harness of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1 is a top view of a first embodiment of a harness in accordance with the present invention;

FIG. 2 is a side view of harness portions adapted to fit over the shoulders of a user;

FIG. 4 illustrates an alternative embodiment of a harness in accordance with the present invention having adjustable gripping members for gripping a load to be transported; and FIG. 5 illustrates an alternative embodiment of a harness in accordance with the present invention.

DETAILED DESCRIPTION OF THE PREFERRED EMBODIMENT(S)

Figure 3:
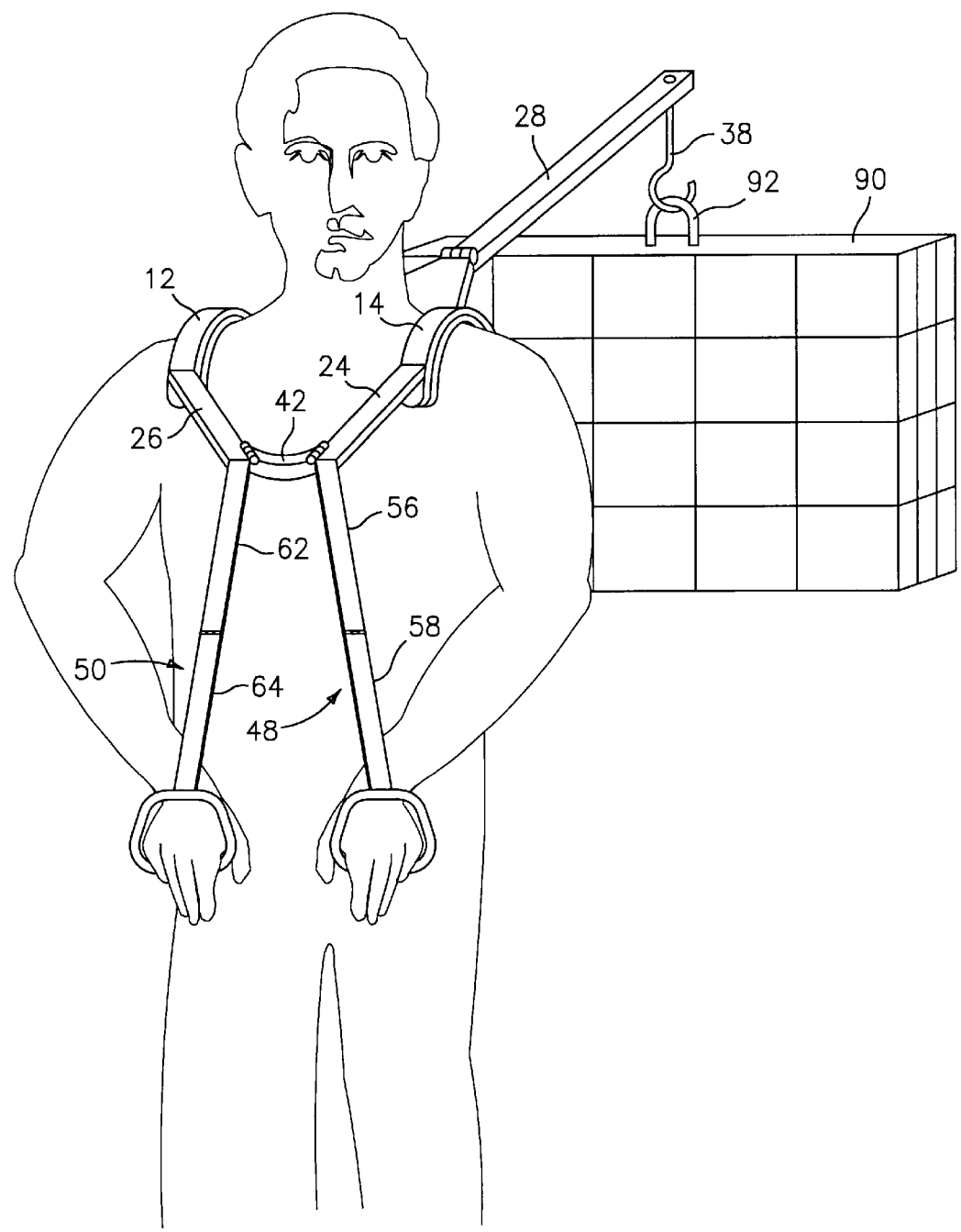
FIG. 3 illustrates the harness of FIG. 1 being worn by a user to transport a load.

Referring now to the drawings, FIG. 1 illustrates a first embodiment of a harness 10 in accordance with the present invention. As shown in this figure, the harness 10 has a pair of arcuately shaped pieces 12 and 14 which fit over the shoulders of a user. The pieces 12 and 14 may be formed from any suitable material known in the art. For example, as shown in FIG. 2, the arcuately shaped pieces 12 and 14 may have a multi-layer construction including at least an upper layer 16 formed from a rigid material and a lower layer 18 which serves as padding to prevent the harness 10 from cutting into the shoulders of the user when a load is being lifted and/or transported. The lower layer 18 may be formed from any suitable foamed plastic material known in the art. Preferably, the upper layer 16 is formed from a rigid plastic material; however, it can be formed from a lightweight metal material, such as aluminum, if desired.

Attached to shoulder portions are members 20, 22, 24, and 26, each of which is preferably formed from a rigid plastic material. The members 20, 22, 24, and 26 may be joined to the shoulder pieces 12 and 14 in any suitable manner known in the art. If desired, the members 20 and 24 may be formed from a unitary length of plastic material. Similarly, if desired, the members 22 and 26 may be formed from a unitary length of plastic material.

The members or arms 20 and 22 extend from the rear of the shoulder pieces 12 and 14 and are connected to a load support arm 28. In a preferred construction, the members 20 and 22 are hingedly connected to the load support arm 28 by hinges 30 and 32 so as to allow the harness 10 to be collapsible for storage and transport when not in use. The hinges 30 and 32 also allow the harness 10 to be adjustable so as to permit it to be adaptable to different users. The hinges 30 and 32 may comprise any suitable hinges known in the art.

As shown in FIG. 1, the load support arm 28 includes a first section 34 and a second section 36 to which a load carrying device such as hook 38 is attached. In a preferred construction of the present invention, the sections 34 and 36 are formed from a rigid plastic material, although they could also be formed from a lightweight metallic material, such as aluminum. The hook 38 may be formed from any suitable material known in the art having sufficient strength to carry a load to be transported. Preferably, the section 36 is hingedly connected to the section 34 by hinge 40. The hinge 40 may be any suitable hinge construction known in the art which allows the section 36 to be rotated upwardly and inwardly towards the shoulder pieces 12 and 14 when the harness is not in use and which maintains the section 36 in an extended load carrying position, such as that shown in FIG. 3, when the harness is being used to transport a load.

To prevent a load carried by the hook from swinging and hitting a user, a safety pad 39 may be provided. The safety pad can be attached to the arcuately shaped shoulder pieces 12 and 14 by rigid strut members 41. If desired, the struts 41 may be disengageably connected to the pieces 12 and 14 so as not to interfere with the ability to collapse the harness for storage. Any suitable means known in the art may be used to connect the struts 41 to the pieces 12 and 14.

The members 24 and 26 extend from the front of the shoulder pieces 12 and 14. In a preferred construction, the members 24 and 26 are joined to a cross-piece 42 which extends across the chest of a user when the harness 10 is used. As shown in FIG. 1, the members 24 and 26 are hingedly connected to the cross-piece 42 by hinges 44 and 46 to allow the harness 10 to be collapsible to facilitate storage and transport when the harness is not in use. The hinges 44 and 46 may comprise any suitable hinges known in the art.

The members 24 and 26 and the cross-piece 42 may be formed from any suitable material known in the art. Preferably, they are formed from a rigid plastic material or a lightweight metallic material, such as aluminum.

Attached to the members 24 and 26 are strap-like members 48 and 50. The strap-like members 48 and 50 are also formed from a rigid material such as a rigid plastic material or a lightweight metallic material such as aluminum. As shown in FIG. 1, the members 48 and 50 may cross each other. Where they cross, they may be connected or joined to each other. If desired, as shown in FIG. 3, the members 48 and 50 may be joined in a non-crossing manner to the cross-piece 42.

Each strap-like member 48 and 50 terminates in a respective hand grip 52 and 54. As will be explained in more detail hereinafter, the hand grips 52 and 54 are used to help lift the load prior to transport and to adjust the positioning of the harness 10 on the user during the carrying and transport of the load.

While the strap-like members 48 and 50 may be formed from a single piece of rigid material, it is preferred to form them from two pieces of rigid material hingedly joined together. This further allows the harness to be collapsed when not in use and to facilitate storage and transport of the collapsed harness. Thus, strap-like member 48 may be formed by a first member 56 hingedly connected to a second member 58 by hinge 60. Similarly, the strap-like member 50 may be formed by a first member 62 hingedly connected to a second member 64 by hinge 66. The hinges 60 and 66 may comprise any suitable hinge mechanism known in the art which allows each respective second member 58, 64 to be rotated upwardly and inwardly towards the shoulder pieces 12 and 14 when the harness is not in use and which maintains each respective second member 58, 64 in an aligned position with each respective first member 56, 62 when the harness is in use.

The harness 10 of the present invention may be used to transport a wide variety of loads. For example, it could be used to transport a load, such as a load of logs or stones positioned in a canvas carrier with handles or a net, by attaching the canvas carrier or the net to the hook 38. FIG. 3 illustrates a load in a mesh carrier 90 having handles 92 attached to the hook 38. The harness 10 may also be used to pull a cart (not shown) containing a load. To do this, the hook 38 is attached to the handle of the cart. If desired, the harness 10 may also be used to transport a load in a box or carton. An embodiment for carrying such a load is shown in FIG. 4.

Referring now to FIG. 4, a pair of grippers 68 and 70 for gripping the sides of a box or a carton is shown. The grippers 68 and 70 are connected to arms 78 and 80, respectively. Each arm 78, 80 includes a set of teeth 74 and 76, respectively, for allowing the positioning of the arms and thus the spacing of the grippers to be adjusted. A ratchet or gear-like mechanism 72 is rotatably attached to the second section 36 of the load arm support 28. The ratchet or gear-like mechanism includes a set of teeth 82 which engage or mesh with the teeth 74 and 76 on the ends of the arms 78 and 80. When the ratchet or gear-like mechanism 72 is rotated, the engagement of the teeth 74, 76 and 82 cause the grippers 68 and 70 to move toward or away from each other. A handle 84 may be provided to rotate the ratchet or gear-like mechanism 72.

Once the harness 10 has been placed on the shoulders of a user and a load has been attached to the load support arm 28 via the hook 38 or the grippers 68 and 70, the user places his or her hands into the hand grips 52 and 54. By pushing down on the hand grips 52 and 54, the user causes the harness to pivot on his/her shoulders and safely lift the load using his/her arm muscles, chest muscles, and shoulders. There is no need to use one's knees or back to lift the load. Once the load is lifted slightly off the ground, or in the case of a cart, the front of the cart is off the ground, the user can transport the load to a desired location.

As can be seen from the foregoing description, the harness 10 of the present invention is easy to use and ergonomically sound. Further, when the harness is not in use, it can be collapsed into a compact size for storage and transportation. The harness of the present invention has particular utility in performing household chores such as yard work.

While the harness 10 has been described as having a cross-piece 42 which fits across the chest of the user, this piece may be omitted if desired. When the cross-piece 42 is omitted, the member 24 may be merged into a single piece with the strap-like member 50. Similarly, the member 26 may be merged into a single piece with the strap-like member 48. Such a construction is illustrated in FIG. 5.

While it is preferred to form the strap-like members 48 and 50 from rigid materials, it is within the scope of the present invention to form the strap-like members 48 and 50 from a soft flexible material, such as a cloth material. When the strap-like members are formed from a soft flexible material, the hinges 60 and 66 may be omitted, the sections 56 and 58 may be a unitary length of material, and the sections 62 and 64 may be a unitary length of material.

While it is preferred to form the members or arms 20 and 22 from a rigid material, it is possible to form these members from a flexible soft material such as a cloth material. When the members or arms 20 and 22 are formed from a soft material, the hinges 30 and 32 may be omitted.

It is apparent that there has been provided in accordance with the present invention an ergonomic lift and transport harness which fully satisfies the means, objects and advantages set forth hereinabove. While the present invention has been described in the context of specific embodiments thereof, other variations, alternatives, and modifications will be apparent to those skilled in the art after reading the foregoing description. Therefore, it is intended to embrace such variations, alternatives, and modifications as fall within the broad scope of the appended claims.

What is claimed is:

1. A harness to be worn by a user to enable said user to transport a load, said harness comprising:

arcuately shaped pieces which fit over the shoulders of a user;

said arcuately shaped shoulder pieces having a front and a rear;

first and second arms connected to and extending rearwardly from said arcuately shaped shoulder pieces;

a load support arm secured to said first and second arms to which said load to be transported is attached;

means separate from said first and second arms connected to and extending from the front of said arcuately shaped shoulder pieces for enabling a user to lift said load and properly position said harness on said shoulders so that said load may be transported safely; and said connected means including a pair of hand grips positioned below said arcuately shaped shoulder pieces and in front of said user for causing the harness to pivot on the user's shoulders when the user pushes said hand grips and lifts the load.

2. A harness according to claim 1, wherein said means connected to the front of said arcuately shaped shoulder pieces further comprises first and second adjustment and support members attached to said arcuately shaped shoulder pieces and to said pair of hand grips.

3. A harness according to claim 2, wherein said first and second adjustment and support members are formed by rigid members.

4. A harness according to claim 2, wherein said first and second adjustment and support members are formed from at least one of a rigid plastic material and a lightweight metallic material.

5. A harness according to claim 1, wherein said arcuately shaped shoulder pieces comprise arcuately shaped shoulder pads which fit over a user's shoulders.

6. A harness according to claim 1, wherein said first and second arms are formed from a rigid material.

7. A harness according to claim 6, wherein said rigid material is a rigid plastic material.

8. A harness according to claim 6, wherein said rigid material is lightweight metallic material.

9. A harness to be worn by a user to enable said user to transport a load, said harness comprising:

arcuately shaped pieces which fit over the shoulders of a user;

said arcuately shaped shoulder pieces having a front and a rear;

first and second arms extending from the rear of said arcuately shaped shoulder pieces;

means secured to said first and second arms to which said load to be transported may be attached;

means connected to the front of said arcuately shaped shoulder pieces for enabling a user to lift said load and properly position said harness on said shoulders so that said load may be transported safely;

said means connected to the front of said arcuately shaped shoulder piece comprising first and second adjustment and support members attached to said arcuately shaped shoulder pieces;

said first and second adjustment and support members each terminating in a hand grip to be gripped by said user; and said first adjustment and support member crossing said second adjustment and support member.

10. A harness according to claim 9, wherein said first adjustment and support member is joined to said second adjustment and support member where said adjustment and support members cross each other.

11. A harness according to claim 9, further comprising a chest support member and said chest support member being hingedly connected to said first and second adjustment and support members.

12. A harness to be worn by a user to enable said user to transport a load, said harness comprising:

arcuately shaped pieces which fit over the shoulders of a user;

said arcuately shaped shoulder pieces having a front and a rear;

first and second arms extending from the rear of said arcuately shaped shoulder pieces;

means secured to said first and second arms to which said load to be transported may be attached;

means connected to the front of said arcuately shaped shoulder pieces for enabling a user to lift said load and properly position said harness on said shoulders so that said load may be transported safely;

said means connected to the front of said arcuately shaped shoulder piece comprising first and second adjustment and support members attached to said arcuately shaped shoulder pieces; and each of said first and second adjustment and support members including a first section, a second section hingedly connected to said first section, and a hand grip joined to said second section.

13. A harness according to claim 12, wherein said means to which a load may be attached comprises a load support arm connected to said first and second arms.

14. A harness according to claim 13, wherein said first and second arms are hingedly connected to said load support arm to allow said harness to be folded.

15. A harness according to claim 13, wherein said load support arm has a first section joined to said first and second arms and a second section hingedly connected to said first section to allow said harness to be folded.

16. A harness to be worn by a user to enable said user to transport a load, said harness comprising:

arcuately shaped pieces which fit over the shoulders of a user;

said arcuately shaped shoulder pieces having a front and a rear;

first and second arms extending from the rear of said arcuately shaped shoulder pieces;

means secured to said first and second arms to which said load to be transported may be attached;

means connected to the front of said arcuately shaped shoulder pieces for enabling a user to lift said load and properly position said harness on said shoulders so that said load may be transported safely;

said means to which a load may be attached comprising a load support arm connected to said first and second arms; and said means to which a load may be attached further comprising a hook attached to said load support arm.

17. A harness to be worn by a user to enable said user to transport a load, said harness comprising:

arcuately shaped pieces which fit over the shoulders of a user;

said arcuately shaped shoulder pieces having a front and a rear;

first and second arms extending from the rear of said arcuately shaped shoulder pieces;

means secured to said first and second arms to which said load to be transported may be attached;

means connected to the front of said arcuately shaped shoulder pieces for enabling a user to lift said load and properly position said harness on said shoulders so that said load may be transported safely;

said means to which a load may be attached comprising a load support arm connected to said first and second arms; and said means to which a load may be attached further comprising a pair of grippers for gripping said load and means for adjusting the relative position of said grippers connected to said load support arm.

18. A harness according to claim 17, wherein:

each said gripper is attached to a respective arm;

each said arm has a set of teeth; and said adjusting means comprises a gear-like mechanism having a set of teeth for engaging said teeth on said arms.

* * * * *